Patented May 31, 1932

1,860,469

UNITED STATES PATENT OFFICE

CARL LUDWIG LAUTENSCHLÄGER, OF FRANKFORT-ON-THE-MAIN, WILLY LUDWIG, OF FRANKFORT-ON-THE-MAIN-HOCHST, AND OTTO SCHAUMANN, OF WIESBADEN, GERMANY, ASSIGNORS TO WINTHROP CHEMICAL COMPANY, INC., OF NEW YORK, N. Y., A CORPORATION OF NEW YORK

PROCESS FOR OBTAINING ACTIVE SUBSTANCES FROM HYPOPHYSIS GLANDS

No Drawing. Application filed February 1, 1929, Serial No. 336,913, and in Germany February 4, 1928.

The present invention relates to the preparation of active substances from the hypophysis glands.

A process of producing extracts containing the active substances of the whole hypophysis has hitherto been unknown. It was only known to extract the whole gland in order to obtain the active principles of the posterior lobe of the hypophysis. The extracts from the posterior division of the glandula pituitaria have been used for many years in medicine as labour-promoting agents (oxytocics); specific effects of the said extracts or implantations of the anterior lobe are only mentioned in recent publications on researches in this regard. But in the pertaining literature, stress is laid on the sensitiveness of the active substances of the posterior lobe as well as of the anterior lobe; Stasiak, for instance, ascertained (cf. I. Pharm. and Exp. Ther. 28), that the active substances of the hypophysis extracts are destroyed by boiling them with diluted hydrochloric acid or by treating them with an alkali. Furthermore Abel, Guggenheim, Draper, etc. refer to the sensitiveness to alkali of the active substances of the posterior lobe.

Now we have found that, in spite of the above mentioned sensitiveness of the extracts towards acids and alkali, it is possible to produce extracts of the active substances from the hypophysis, by treating it with hydrolyzing agents at a temperature of between 1° C. and 70° C. For these purposes especially alkalies and organic- or inorganic acids are suitable. For this treatment much higher concentrations of the hydrolyzing agent for instance NaOH, HCl, may be used than has hitherto been indicated for the treatment of the different parts of the hypophysis. For instance even a n/1 caustic soda solution and a 10 n/1 hydrochloric acid may be used. This treatment of hypophysis with a hydrolyzing agent necessitates, however, that the treatment is carried out under mild conditions as regards time and temperature, because otherwise a far-reaching decomposition of the anterior or posterior lobe occurs. That means that the use of the hydrolyzing agents in strong concentration, as for instance above indicated, requires a shorter duration of the action and lower temperatures, whilst when using low concentrations, for instance of n/1/100 caustic soda solution or n/1/100 sulfuric acid, a prolonged action and higher temperatures up to 70° C. can be applied. The duration of the action and the temperature may be largely varied.

By this process, the albuminous substances are hydrolyzed to a great extent. The resulting alkali or acid albuminates and globulinates respectively are then separated by diminishing the acid or alkaline reaction of the hydrolyzing agents and removed, whilst the active substances remain in the solution.

It is not necessary that the treatment of hypophysis is carried out in such a manner that the whole quantity of the active substances is obtained in a single extracting operation. The hydrolyzing treatment of hypophysis may be carried out by degrees whereby a separate production of the various active substances is possible.

The decomposition of the hypophysis substance in order to obtain the active substances may not only be carried out with the abovesaid hydrolyzing agents, but can also be carried out by the influence of ferments capable of splitting albumin, such as papain, or by autolysis.

In order to prevent decomposition when carrying out the hydrolysis with low concentrations of the hydrolyzing agents, preservatives may be added, such as phenol, trikresol, acetone-chloroform or the like.

The process provides a new way of isolating the active substances of all parts of the hypophysis glands, if required, by a single working operation and may be applied both to fresh and dessicated glands. It may also be utilized to obtain the active substances from the anterior lobes alone.

The extracts thus obtained can be tested by experiments on animals or may further be purified by treating them with an organic solvent.

The following examples serve to illustrate the invention but they are not intended to limit it thereto.

(1) 30 g. of fresh hypophysis are ground and mixed with 50 cc. of water; hydrochloric acid gas is introduced into the suspension for 30 minutes at about 15° C. The mass is then centrifuged, the clear brown substance left after centrifugation is poured off and the residue is again treated as above indicated. The combined centrifuged substances are then neutralized with strong caustic soda solution, the albuminates and globulinates which precipitate are centrifuged and the clear feebly yellow extract is either tested directly as regards the action of the posterior and anterior lobes by experiments on suitable animals or it is first treated with an organic solvent and then tested in the manner above indicated.

(2) 1 g. of dry powder prepared from hypophysis is stirred for 20 minutes in 20 cc. of n/2 caustic soda solution at 35° C. to 40° C. and then centrifuged. The centrifuged substance contains the greater part of the active substance of the posterior lobe. The mass left after centrifugation is repeatedly treated with 20 cc. of n/1 caustic soda solution at 25° C. for 20 minutes. The centrifuged substance thus obtained contains the greater part of the active substance of the anterior lobe. The centrifuged substances may separately or simultaneously be precipitated in the form of flakes by addition of a n/1 hydrochloric acid. The flocculent precipitates are centrifuged; they contain only traces of active substances. The filtrates are then tested as regards their biological activity.

(3) The posterior and anterior lobes prepared from 34 g. of hypophysis are extracted with 50 cc. of a sodium sulfide solution of 3% strength for 20 minutes at 15° C. and then centrifuged; after centrifugating, the alkaline solution is immediately neutralized. This extracting operation is twice repeated and the combined centrifuged substances are precipitated in the form of flakes at about ph: 5 and filtered. The hydrogen sulphide thus liberated is eliminated according to one of the usual methods, but without using any raised temperature, and the resulting extract is tested on a suitable animal.

(4) 25 g. of ground fresh hypophysis are treated with a suspension of 0.2 g. of succ. caricae papayae in 25 cc. of water and 3 cc. of toluene. The mass is then allowed to stand at 38° C. in the incubator at ph: 5–6.5 for four hours and then for some time at room temperature. After centrifugation a solution is obtained which, if required, may be further purified.

(5) 20 g. of fresh ground anterior lobe of the hypophysis are agitated with 20 cc. of water for 3 hours while adding a preservative such as trikresol and the mass is then allowed to stand for three days. The resulting reddish-brown solution which has formed by autolysis is further purified and tested as indicated in Example 1.

By the term "agents causing a hydrolysis" there are to be understood in the following claims alkalies, organic and inorganic acids and ferments capable of splitting albumin.

We claim:

1. The new process for obtaining extracts containing the active substances of the posterior and the anterior lobe of the hypophysis which consists in treating the whole hypophysis at a temperature of between 1° C. and 70° C. with agents causing a hydrolysis of the hypophysis and precipitating from the reaction product the albumin degradation products by neutralization of the hydrolyzing agent.

2. The new process for obtaining extracts containing the active substances of the posterior and the anterior lobe of the hypophysis which consists in treating by degrees the whole hypophysis at a temperature of between 1° C. and 70° C. with agents causing hydrolysis of the hypophysis and precipitating from the resulting reaction products the albumin degradation products by neutralization of the hydrolyzing agent.

3. The new process for obtaining extracts containing the active substances of the posterior and the anterior lobe of the hypophysis which consists in subjecting the whole hypophysis at a temperature of between 1° C. and 70° C. to the influence of a mineral acid and precipitating from the reaction product the albumin degradation product by diminishing the acid reaction of the mineral acid.

4. The new process for obtaining extracts containing the active substances of the posterior and the anterior lobe of the hypophysis which consists in subjecting the whole hypophysis at a temperature of between 1° C. and 70° C. to the influence of hydrochloric acid and precipitating from the reaction product the albumin degradation products by diminishing the acid reaction of the hydrochloric acid.

In testimony whereof, we affix our signatures.

CARL LUDWIG LAUTENSCHLÄGER,
WILLY LUDWIG.
OTTO SCHAUMANN.